United States Patent [19]
Bond

[11] Patent Number: 5,369,663
[45] Date of Patent: Nov. 29, 1994

[54] SPATIAL COMBINER FOR A DIGITAL VLF/LF RECEIVER

[75] Inventor: James W. Bond, San Diego, Calif.

[73] Assignee: The United States of America as represented by the Secretary of the Navy, Washington, D.C.

[21] Appl. No.: 664,692

[22] Filed: Mar. 5, 1991

[51] Int. Cl.[5] .................. H04L 27/30; G01S 3/16; G01S 3/28

[52] U.S. Cl. .......................... 375/1; 380/34; 342/16; 342/372; 342/380; 342/383; 455/278.1; 455/283; 455/284

[58] Field of Search .............. 375/1; 380/34; 342/12–14, 372, 380, 383, 16; 455/276, 278, 283, 284; 364/572, 582, 724.01, 825

[56] References Cited

U.S. PATENT DOCUMENTS

| | | | |
|---|---|---|---|
| 4,079,379 | 3/1978 | Piesinger | 342/368 |
| 4,214,244 | 7/1980 | McKay et al. | 342/17 |
| 4,575,724 | 3/1986 | Wiener | 342/383 |
| 4,608,701 | 8/1986 | Burgers et al. | 375/1 |
| 4,635,221 | 1/1987 | Kerr | 375/1 X |
| 4,651,155 | 3/1987 | Baurle et al. | 342/378 |
| 4,670,885 | 6/1987 | Parl et al. | 375/1 |
| 4,734,701 | 3/1988 | Grobert | 342/380 |
| 5,001,723 | 3/1991 | Kerr | 375/1 |

Primary Examiner—Bernarr E. Gregory
Attorney, Agent, or Firm—Harvey Fendelman; Thomas Glenn Keough

[57] ABSTRACT

A spatial combiner for connection to a receiver used in conjunction with a plurality of direction-sensitive antennas for receiving a spread-spectrum communication signal in the presence of interference includes a steering network, a plurality of normalizers, and a plurality of combiners. The steering network combines N inputs from N antennas and produces outputs $J_1, J_2, \ldots, J_M$, with M being a multiple of K and K a positive integer such that each M output is a weighted sum of N inputs from the antennas. The normalizers receive and normalize the M outputs to unit energy and produce normalized outputs $J^\wedge_1, J^\wedge_2, \ldots, J^\wedge_M$. The combiners receive normalized outputs and sum the first K outputs to produce output $C_1$, sum the next K outputs to produce output $C_2$, and continuing summing outputs in the same manner until summing the last K outputs occurs to produce output $C_{M/K}$. The outputs $C_1$ through $C_{M/K}$ of the combiners can thereafter be processed in parallel through at least synchronization processing to identify which one of the combiner outputs is providing synchronization.

11 Claims, 3 Drawing Sheets

SPATIAL COMBINER FOR A DIGITAL VLF/LF RECEIVER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to VLF/LF communications and, more particularly, to a spatial combiner for connection to a digital VLF/LF receiver used in conjunction with a direction-sensitive antenna suite and receiving spread-spectrum signals, wherein the spatial combiner is provided to improve receiver performance in the presence of interference arriving from directions different than the communication signal being received.

For direction-sensitive antenna suites normally used for VLF/LF communications, a pair of orthogonal loop antennas, with or without an omnidirectional antenna, for manual steering of the antennas has been the standard. Efforts to implement electronic steering have focussed on adaptive antenna steering algorithms of various types which do not require operator interactions. Performance of these algorithms is sensitive to the properties of the antenna and the received communication signal and interferers.

Consequently, a need exists for an alternative approach in which performance is substantially insensitive to the properties of the antenna and the received communication signal and inference.

SUMMARY OF THE INVENTION

The present invention relates to a spatial combiner which uses a non-adaptive fixed network to combine the antenna outputs. The spatial combiner of the present invention provides performance gains whenever the received spread-spectrum signal is spatially resolvable from one or more strong interferers and is impervious to most direction-of-arrival variations and interferer properties.

In accordance with the present invention, the spatial combiner is intended to be connected to a receiver, such as a digital VLF/LF receiver, used in conjunction with a plurality of direction-sensitive antennas for receiving a spread-spectrum communication signal in the presence of interference arriving from directions different than the communication signal being received. The spatial combiner basically includes a steering network, a plurality of normalizers, and a plurality of combiners.

The steering network is operable for combining N inputs from N antennas and producing outputs $J_1, J_2, \ldots, J_M$, with M being a multiple of K and K a positive integer such that each of the M outputs is a weighted sum of the N inputs from the antennas. The normalizers are operable for receiving the M outputs, normalizing the M outputs to unit energy and producing normalized outputs $J^{\wedge}_1, J^{\wedge}_2, \ldots, J^{\wedge}_M$. The combiners are operable for receiving the normalized outputs and summing the first K of the outputs to produce output $C_1$, summing the next K of the outputs to produce output $C_2$, and continuing summing of the outputs in the same manner until summing the last K of the outputs occurs to produce output $C_{M/K}$. The outputs $C_1$ through $C_{M/K}$ of the combiners can thereafter be processed in parallel through at least synchronization processing to identify which one of the combiner outputs is providing synchronization.

OBJECTS OF THE INVENTION

Accordingly, it is the primary object of the present invention to disclose a spatial combiner which provides performance improvements when connected to a receiver that is used in conjunction with a direction-sensitive antenna suite.

Another object of the present invention is to disclose a spatial combiner which also provides performance improvements when connected to a receiver that is receiving spread-spectrum signals.

Still another object of the present invention is to disclose a spatial combiner which operates independently of variations in the received communication signal direction-of-arrival.

Other objects, advantages and novel features of the invention will become apparent from the following detailed description of the invention when considered in conjunction with the accompanying drawings.

DETAILED DESCRIPTION OF THE INVENTION

Figure 1:
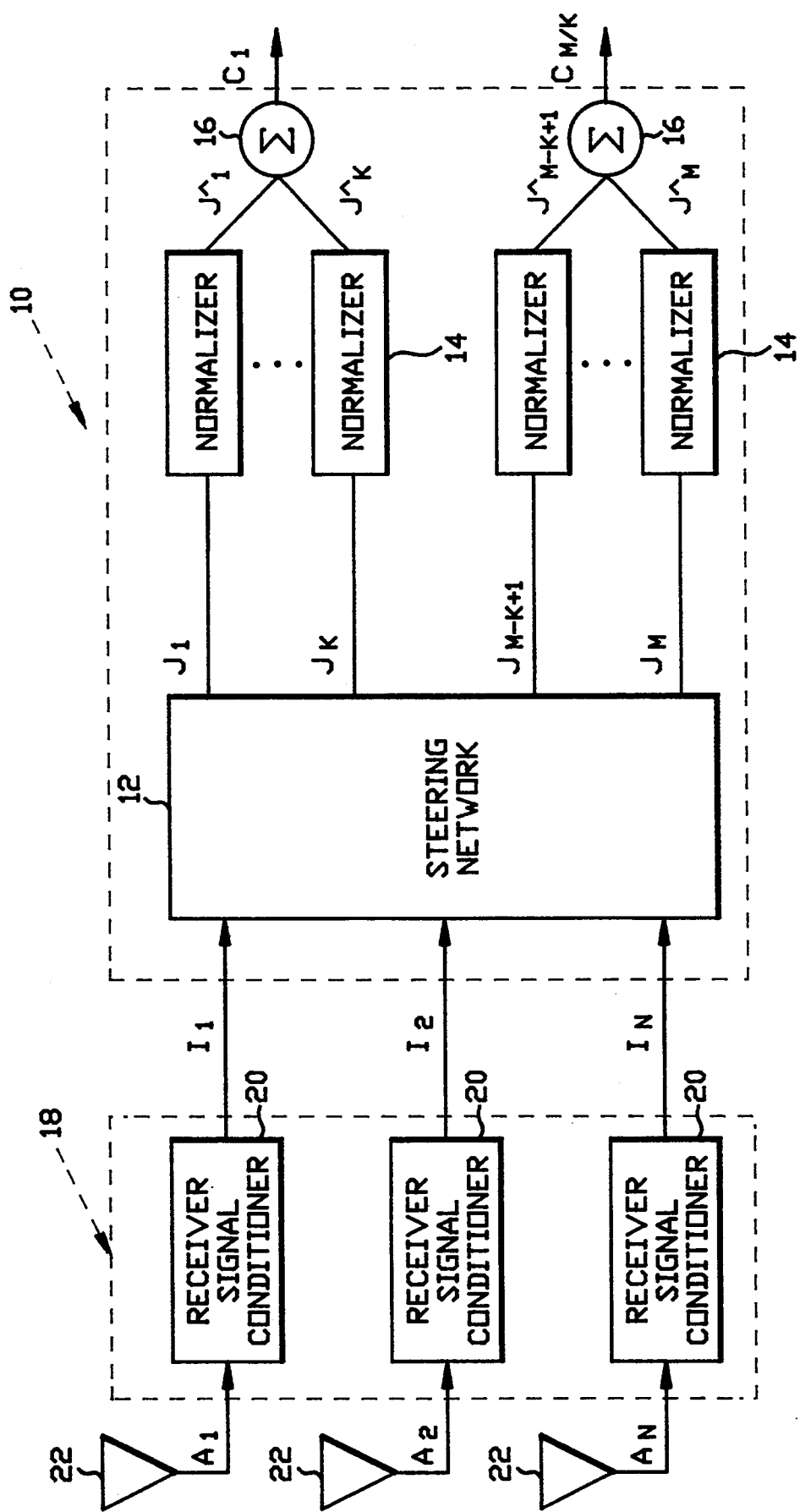
FIG. 1 is a block diagram of a spatial combiner in accordance with the present invention.

Referring now to the drawings, and particularly to FIG. 1, there is illustrated a spatial combiner, generally designated 10, in accordance with the principles of the present invention. Spatial combiner 10 basically includes a steering network 12, a plurality of normalizers 14, and a plurality of combiners 16.

In the embodiment illustrated in FIG. 1, spatial combiner 10 is connected to a digital VLF/LV receiver 18. Receiver 18 includes a plurality of signal conditioners 20 located between spatial combiner 10 and an array of direction-sensitive antennas 22. The receiver 18 connected to spatial combiner 10 is of the type used conjunction with direction-sensitive antennas 22 for receiving a spread-spectrum communication signal in the presence of interference arriving from directions different than the communication signal being received.

Antennas 22 generate analog signals, $A_1, A_2, \ldots, A_N$, with $N > 1$ and normally equal to either 2 or 3. The N analog signals are received and processed by signal conditioners 20. Signal conditioners 20 produce N outputs which, in turn, provide N inputs, $I_1, I_2, \ldots, I_N$, to spatial combiner 10. The conventional processing performed by signal conditioners 20 typically involves analog-to-digital conversion, several stages of gain control and bandpass filtering, and down-conversion from radio frequency (RF) to intermodulation frequency (IF). Since signal conditioners 20 of receiver 18 are conventionally well-known and do not form part of spatial combiner 10 of the present invention, they need not be described in greater detail.

Figure 2:
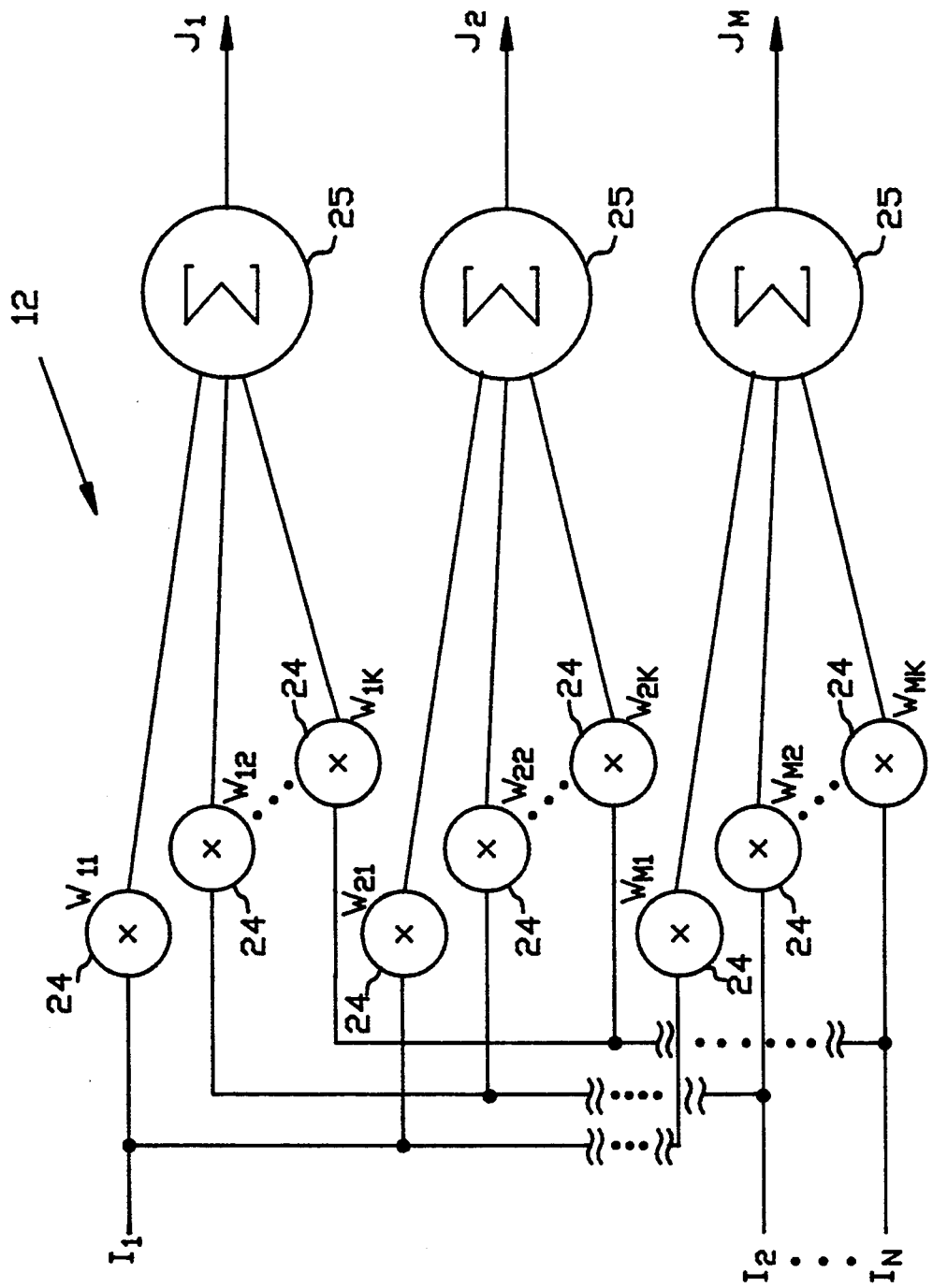
FIG. 2 is a block diagram of a steering network of the spatial combiner of FIG. 1.

Referring to FIG. 2, steering network 12 of spatial combiner 10 applies weights $W_{11}$ through $W_{MK}$ at nodes 24 to each of the inputs, $I_1, I_2, \ldots, I_N$, and the weighted inputs are summed by summers 25 connected to sets of the nodes 24 to produce M outputs, $J_1, J_2, \ldots, J_M$. The weights, $W_{11}$ through $W_{MN}$, are real numbers fixed by the design of network 12, which do not vary during the operation of spatial combiner 10. The weights are chosen to steer equally-spaced (or nearly equally spaced) nulls in the beam pattern of the array of antennas 22. The sum of the weights used to combine inputs $I_1$ through $I_N$ to form an output J sum to approximately to unity (or 1). Normalizers 14 which follow steering network 12 automatically adjust for deviations of the sum of the weights from unity. By providing this capability in normalizers 14, added flexibility is allowed in the choice of available components to implement the required multiplications in steering network 12.

Steering network 12 thus receives the inputs, $I_1, I_2, \ldots, I_N$, from N antennas 22, via signal conditioners 20, and is operable for combining the N inputs and producing outputs $J_1, J_2, \ldots, J_M$. Integer M is a multiple of K with K being a positive integer. Each of the M outputs is a weighted sum of the N inputs from antennas 16.

Figure 3:
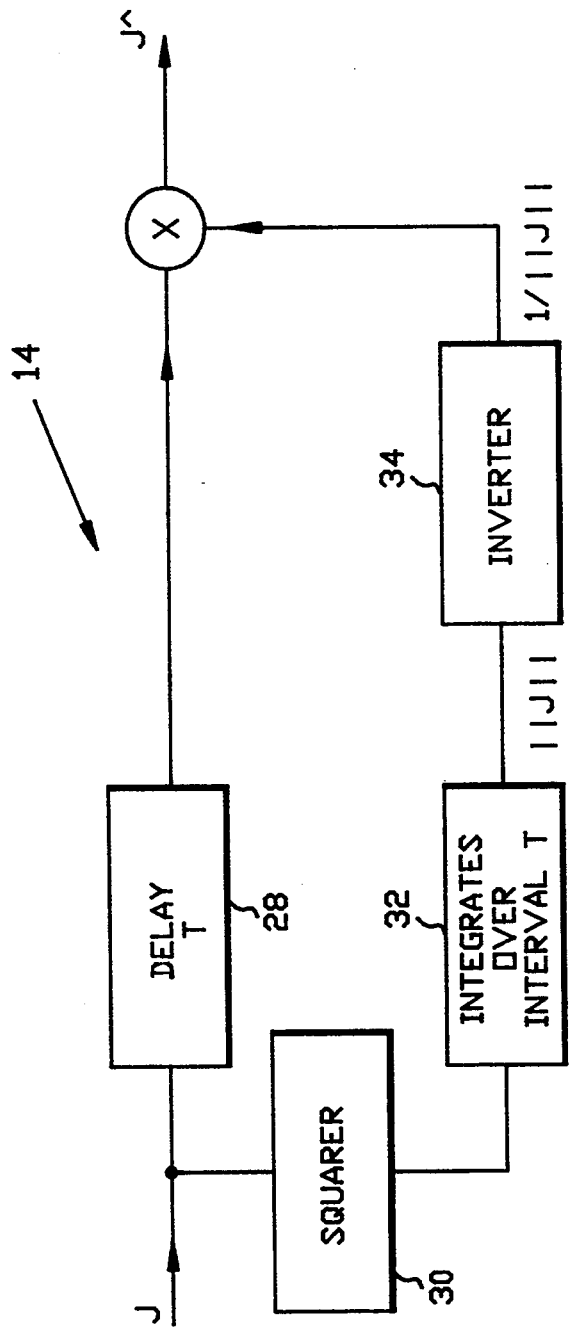
FIG. 3 is a block diagram of one of the normalizers of the spatial combiner of FIG. 1.

Referring to FIG. 3, each normalizer 14 of spatial combiner 10 functions to reduce the average power of the outputs from steering network 12, which, in turn, are inputs J to the normalizers 14, to unity. Each normalizer 14 is composed of two parallel paths connected to a multiplier 26. A delay 28 is interposed in one path and a serial arrangement of a squarer 30, integrator 32 and inverter 34 is provided in the other path. $||J||$ denotes the average power of the input J for an integration time T. Integrator 32 outputs $||J||$, and inverter 34 outputs $1/||J||$. Then, each sample of the input signal J for the time period T, which has been accumulated to generate $||J||$, is multiplied by $1/||J||$ at multiplier 26 and produces the output signal $J^\wedge$ which has unit energy over the time period T. Normalizers 14 thus receive the M outputs, $J_1, J_2, \ldots, J_M$, from steering network 12 and are operable for normalizing the M outputs to unit energy and producing normalized outputs $J^\wedge_1, J^\wedge_2, \ldots, J^\wedge_M$.

The values of integration time T can be restricted to an integer multiple of the bit interval of the digital signal. This is desirable to protect against any impacts of spatial combiner 10 on synchronization and despreading due to gain changes in the communication signal induced by the combiner. The integration time T is chosen to be the same for all M outputs of steering network 12.

Figure 4:
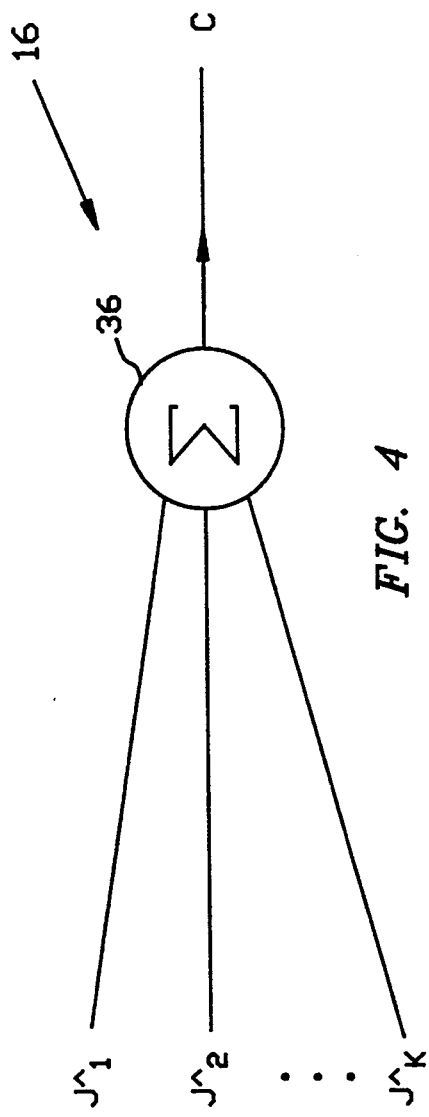
FIG. 4 is a block diagram of one of the combiners of the spatial combiner of FIG. 1.

Referring to FIG. 4, each of combiners 16 of spatial combiner 10 is merely a summer 36 which simply sums K successive normalized inputs $J^\wedge_1$ through $J^\wedge_K$ to form a combined output C. Combiners 16 thus are operable for receiving the normalized inputs and summing the first K of the outputs to produce output $C_1$, summing the next K of the outputs to produce output $C_2$, and continuing summing of the outputs in the same manner until summing the last K of the outputs occurs to produce output $C_{M/K}$.

The outputs $C_1$ through $C_{M/K}$ of combiners 16 can thereafter be processed using conventional detection, synchronization, and despreading algorithms in parallel. The output leading to the highest correlation sum in the despreading process is then routed to decoding and sent to a display. These conventional processing steps do not form part of the spatial combiner of the present invention and thus need not be described in detail.

There are several variations of normalizers 14 which may be desirable depending on the hardware/software environment of VLF receiver 18 to which spatial combiner 10 is connected. The signals could be normalized by using standard automatic gain devices. If the receiver contains time-domain processing in the front, or receiving, end to eliminate impulsive noise, then a second alternative of the normalizers becomes feasible. The integrations in the normalizers could be replaced by a comparer and store devices designed to estimate the maximum amplitude of the input signal to the device over a time period T. This value could then be inverted and passed to the multiplier. It can then find the maximum amplitude of the incoming signal to it for the next T seconds.

The spatial combiner 10 connected to receiver 18 may be implemented in various ways. If the antenna inputs to the receiver have been split into in-phase and quadrature components before they become readily available for spatial processing, then spatial combiner 10 would be implemented independently with each of these components. Steering network 12, normalizers 14, and combiners 16 need not be implemented serially as illustrated in FIG. 1. For instance, steering network 12 could be implemented before RF-to-IF conversion and before generation of the in-phase and quadrature components, while the remaining components of spatial combiner 10 could be implemented after RF-to-IF conversion.

Steering network 12 was described earlier in terms of multipliers. These need not be implemented as hardware multipliers since all required multiplications are for prescribed weights with a very regular structure; thus, cordic type algorithms might be acceptable to produce the required weighted sums.

The weight vectors or multipliers of steering network 12 described earlier assume that the communication signal arrives at the different antennas 22 in phase. If this is not the case, then the steering network multipliers as described do not apply. Instead, the multipliers in spatial combiner 10 are replaced by delays. Each weight vector becomes a vector of time delays which are applied to the inputs of steering network 12 to align the phases of signals arriving in a particular direction. The outputs of steering network 12 are then sums of inputs delayed by these times.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

Having thus described the invention, what is claimed is:

1. A spatial combiner for connection to a receiver used in conjunction with a plurality of direction-sensitive antennas for receiving a spread-spectrum communication signal in the presence of interference arriving from directions different than the communication signal being received, said spatial combiner comprising:
    (a) steering network means for combining N inputs received from N antennas and producing M outputs $J_1, J_2, \ldots, J_M$, with M being a multiple of K, where K is a positive integer such that each of said M outputs is a weighted sum of said N inputs from said antennas;

(b) a plurality of normalizer means, for receiving said M outputs from said steering network, and for normalizing said M outputs to unit energy and producing normalized outputs $J^*_1, J^*_2, \ldots, J^*_M$; and (c) a plurality of combiner means for receiving said normalized outputs from said plurality of normalizers and summing the first K of said normalized outputs to produce output $C_1$, summing the next K of said normalized outputs to produce output $C_2$, and continuing summing of said outputs until summing the last K of said outputs occurs to produce output $C_{M/K}$.

2. The spatial combiner of claim 1 wherein said steering network means includes:

a plurality of nodes at which preset weights $W_{11}$ through $W_{MK}$ are applied to each of said inputs, $I_1, I_2, \ldots, I_N$; and a plurality of summers connected to sets of said nodes 24 to produce M outputs, $J_1, J_2, \ldots, J_M$ from said weighted inputs.

3. The spatial combiner of claim 1 wherein each of said normalizer means includes:

a multiplier;
a pair of parallel paths connected to said multiplier;
a delay interposed in one of said paths;
a serial arrangement of a squarer, integrator, and inverter interposed in the other of said paths.

4. The spatial combiner of claim 1 wherein each of said combiner means is a summer which sums K successive normalized inputs $J^*_1$ through $J^*_K$ to form a combined output C.

5. The spatial combiner of claim 1 further comprising:
a receiver operably coupled to said steering network means.

6. The spatial combiner of claim 5 further comprising:
a plurality of antennas operably coupled to said receiver.

7. The spatial combiner of claim 6 wherein:
said plurality of antennas comprise an array of direction sensitive antennas.

8. In a combination with a plurality of direction-sensitive antennas for receiving a spread-spectrum communication signal in the presence of interference arriving from directions different than the communication signal being received and a receiving having a plurality of signal conditioners connected to said antennas and receiving analog outputs, $A_1, A_2, \ldots, A_N$, from said antennas and producing N digitized outputs, $I_1, I_2, \ldots, I_N$, a spatial combiner comprising:

(a) a steering network connected to said signal conditioners and receiving and combining said N outputs, $I_1, I_2, \ldots, I_N$, and producing M outputs $J_1, J_2, \ldots, J_M$, with M being a multiple of K, K where is a positive integer such that each of said M outputs is a weighted sum of said N inputs from said antennas;

(b) a plurality of normalizers connected to said steering network and receiving said M outputs from said steering network, normalizing said M outputs to unit energy and producing normalized outputs $J^*_1, J^*_2, \ldots, J^*_M$; and (c) a plurality of combiners connected to said normalizers and receiving said normalized outputs from said normalizers and summing the first K of said normalized outputs to produce output $C_1$, summing the next K of said normalized outputs to produce output $C_2$, and continuing summing of said outputs until summing the last K of said outputs occurs to produce output $C_{M/K}$.

9. The combination of claim 8 wherein said steering network of said spatial combiner includes:

a plurality of nodes at which preset weights $W_{11}$ through $W_{MK}$ are applied to each of said inputs, $I_1, I_2, \ldots, I_N$; and a plurality of summers connected to sets of said nodes 24 to produce M outputs, $J_1, J_2, \ldots, J_M$ from said weighted inputs.

10. The combination of claim 8 wherein each said normalizer of said spatial combiner includes:

a multiplier;
a pair of parallel paths connected to said multiplier;
a delay interposed in one of said paths;
a serial arrangement of a squarer, integrator, and inverter interposed in the other of said paths.

11. The combination of claim 8 wherein each said combiner of said spatial combiner is a summer which sums K successive normalized inputs $J^*_1$ through $J^*_K$ to form a combined output C.

* * * * *